No. 863,434. PATENTED AUG. 13, 1907.
H. PATTISON & L. SCAGLIA.
AUTOMATIC VARIABLE SPEED MECHANISM.
APPLICATION FILED JAN. 29, 1907.

Witnesses.

Inventors.
Henry Pattison.
Luigi Scaglia.
By James L. Norris.
Atty.

UNITED STATES PATENT OFFICE.

HENRY PATTISON AND LUIGI SCAGLIA, OF NAPLES, ITALY.

AUTOMATIC VARIABLE-SPEED MECHANISM.

No. 863,434.

Specification of Letters Patent.

Patented Aug. 13, 1907.

Application filed January 29, 1907. Serial No. 354,733.

*To all whom it may concern:*

Be it known that we, HENRY PATTISON, gentleman, a subject of the King of Great Britain, and LUIGI SCAGLIA, engineer, a subject of the King of Italy, both residing at 137 Corso Vittorio Emanuele, Naples, in the Kingdom of Italy, have invented certain new and useful Improvements in and Relating to Automatic Variable-Speed Mechanisms, of which the following is a specification.

The present invention relates to speed changing and differential gear for automobiles, the object being the automatic changing of speed taking place gradually and continuously between a minimum and a maximum speed in inverse proportion to the resistance to be overcome by the driving wheels of the car, this taking place in each driving wheel independently in a manner to form also a differential or balance gear.

The transmission of motion from the crank-shaft of the motor to the chain sprocket wheels on the driving shaft is obtained by means of friction disks so arranged that the pressure required to produce the necessary friction between the disks is entirely taken up by the shaft carrying the driving disks, so that there is no loss of efficiency, all the stresses set up being exactly balanced and a continuously variable automatic speed and differential gear is attained wherein is employed a continuous or through shaft to carry the driving disks in such manner that full efficiency of the mechanism is attained owing to the balance of the stresses secured by the mounting of the driving disks on said continuous or through shaft and the avoidance of strains on the bearings arising from the pressure developed in producing the necessary frictional contacts between the disks and the parts driven thereby.

Figure 1:
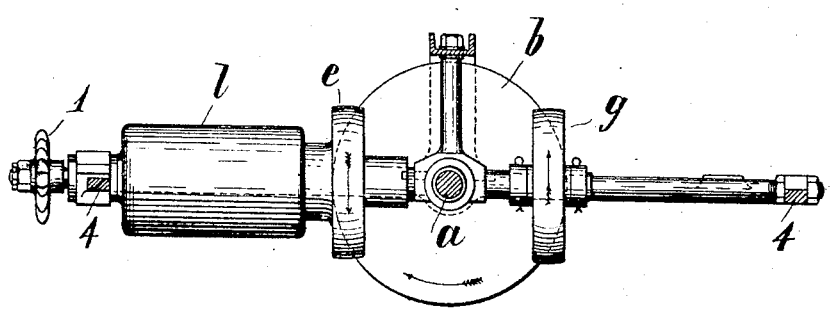
Figure 2:
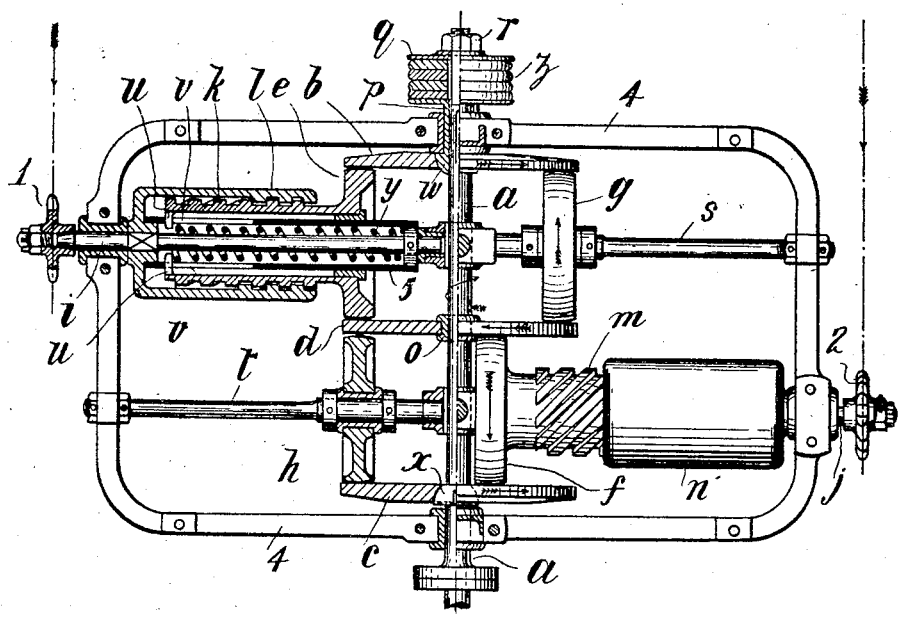

In the drawings, Figure 1 is an end view with the shaft $a$, in section, and Fig. 2 is a plan of the same with the left hand half partly in section.

The mechanism consists of a central shaft $a$ connected to the motor crank shaft, carrying the three disks $b$, $c$ and $d$. The two driving disks, $b$, $c$, are keyed to the driving shaft $a$ by means of ball and socket joints $w$, $x$; while the central disk $d$ is free to rotate on the shaft by means of the bush $o$. The disk $b$ is free to slide along the shaft $a$, as the ball and socket $w$ does not form part of the shaft as in $x$, but is an independent sleeve $p$ which is free to slide along the shaft. Between the sleeve $p$ and the washer $q$ which is held in place on the shaft $a$ by the nut $r$, there is an elastic cushion $z$ consisting of springs or of disks of india rubber, which maintain the necessary pressure and consequent friction between the driving and driven disks. The three disks $b$, $c$ and $d$ are kept equi-distant from each other and parallel by the four disks $e$, $f$, $g$, $h$. The two disks $g$, $h$, are free to rotate on their respective shafts $s$ and $t$, and serve to transmit the motion to the central disk $d$, while the two disks $e$, $f$, transmit a rotary motion to the two chain sprocket wheels 1 and 2.

By tightening the nut $r$ on the shaft $a$ the compressed india rubber disks $z$ force on the sleeve $p$ and push the disk $b$ towards $c$ thus forcing together the five disks $g$ and $h$, $e$ and $f$ and $d$. The motion of the driving disks $b$, $c$ rotating in the same direction with the shaft $a$ causes all the other disks to revolve in the directions shown by the arrows indicated thereon, *i. e.* the two disks $g$ and $h$ rotating in the same direction cause the disk $d$ to rotate in a contrary direction to $b$ and $c$ so that the two disks $e$ and $f$ which are in contact with the driving disks $b$ and $c$ and with the disk $d$ are both obliged to rotate in the same direction.

The disks $e$ and $f$ are not keyed directly to the chain sprocket shafts $i$ and $j$ but indirectly so by means of the screws $k$ and $m$ and nuts $l$ and $n$ the latter being keyed to the shaft of the sprocket wheels 1 and 2. The screw $k$ is right-handed, and the screw $m$ left-handed so that when rotating in the same direction the disks $e$ and $f$ tend to approach the shaft $a$, *i. e.* take up the position of the disk $f$.

The spring $y$ on the sprocket wheel shaft $i$ is held within the tube 5 and rests on the projecting lugs $u$ of the screw $k$, which lugs project through the helicoid slots $v$ in the sides of the tube 5 and push the disk $e$ as far as possible from the shaft $a$; in which position the velocity of the disk $e$ is greatest and corresponds to a minimum resistance of the driving wheel of the motor car driven by the chain sprocket wheel 1.

If the resistance of the driving wheel is doubled the force with which the screw $k$ pushes the disk $e$ towards the shaft $a$ will also be doubled. then the spring $y$ will be compressed until its resistance acting on the projecting lugs $n$ becomes equal to the force transmitted by the screw $k$. The spring $y$ must be so proportioned that when the resistance is doubled the disk $e$ is obliged to approach the shaft $a$ until it reaches a position where its velocity of rotation is reduced to about one half. Thus it happens that the number of revolutions of the sprocket wheels 1, 2, will vary gradually in inverse proportion to the resistances of the corresponding driving wheels. If the resistances of the driving wheels are equal, then the disks $e$ and $f$ will take up a position equi-distant from the shaft $a$, and will both have the same number of revolutions. If the resistances of the driving wheels are unequal, one being greater than the other, as occurs when a motor car is taking a sharp curve, one sprocket wheel will have a greater number of revolutions per minute than the other, because the corresponding disk will have taken up a position further from the shaft *a* than the disk of the other sprocket wheel.

It is thus clear that the mechanism described acts automatically and continuously as a change speed gear and also as a differential or balance gear.

The shaft *a* and the four shafts *s*, *t*, *i* and *j*, are carried by bearings fixed to a frame 4, 4, which may be independent of the chassis of the car or fixed to the engine frame, or even to the chassis itself.

We are aware that it has been proposed to regulate the position of the roller on the face of the disk, in a change speed gear for this purpose, by means of a spiral spring mounted on the shaft of the roller and acting upon a sleeve which is free on the said shaft said sleeve having spiral slots cut in it in which run rollers.

We are also aware that it has been proposed to transmit power in change speed gears by means of double disks with opposing working faces between which rotate two driving or driven rollers forced into contact with the said opposing faces and with each other by means of springs in such a manner as to produce any desired driving friction between the working surfaces, said rollers being drawn in or out to engage the disks at a position of greater or less diameter so as to vary their speed of rotation, but in such construction there was no provision, or convenience, for the employment of a continuous through shaft upon which the driving disks are mounted in such manner that the thrusts and strains requisite to produce the driving frictional contact with the driven rollers, could be borne in a direct manner without the intervention of a spindle frame or the like involving the necessity for employment of ball or like anti-friction bearings.

Having now particularly described and ascertained the nature of our said invention, and in what manner the same is to be performed, we declare that what we claim is:—

1. In a continuously variable automatic speed and differential gear, the combination of a driving shaft, a pair of driven shafts, power-transmitting mechanism connecting said driving shaft to the driven shafts, wheels connected to the driven shafts, and means for modifying the speed of rotation of said driven shafts proportionately to the resistance imposed on the wheels.

2. In a continuously variable automatic speed and differential gear, the combination of a driving shaft, a pair of driven shafts, power-transmitting mechanism connecting said driving shaft to the driven shafts, wheels connected to the driven shafts, means for modifying the speed of rotation of said driven shafts proportionately to the resistance imposed on the wheels and for controlling the rotation of each wheel independently of the velocity of the rotation of the other wheel.

3. In a continuously variable automatic speed and differential gear, the combination of a driving shaft, a pair of driven shafts, power-transmitting mechanism connecting said driving shaft to the driven shafts, wheels connected to the driven shafts, and automatically shiftable means for controlling the rotation of each wheel independently of the velocity of the rotation of the other wheel.

4. In a continuously variable automatic speed and differential gear, a driving shaft, a plurality of disks fixed to said shaft, one of said disks being adjustable longitudinally of said shaft, an intermediate and freely rotatable disk mounted on said shaft, a driven disk and a loosely mounted disk interposed between said intermediate disk and each of the driving disks, a wheel connected to each of said driven disks, and means for modifying the speed of rotation of said driven shafts proportionately to the resistance imposed on the wheels.

5. In a continuously variable automatic speed and differential gear, a driving shaft, a plurality of disks fixed to said shaft, one of said disks being adjustable longitudinally of said shaft, an intermediate and freely rotatable disk mounted on said shaft, a driven disk and a loosely mounted disk interposed between said intermediate disk and each of the driving disks, a wheel connected to each of said driven disks, and means for controlling the rotation of each wheel independently of the velocity of the rotation of the other wheel.

6. In a continuously variable automatic speed and differential gear, a driving shaft, a plurality of disks fixed to said shaft, one of said disks being adjustable longitudinally of said shaft, an intermediate and freely rotatable disk mounted on said shaft, a driven disk and a loosely mounted disk interposed between said intermediate disk and each of the driving disks, a wheel connected to each of said driven disks, means for modifying the speed of rotation of said driven shafts proportionately to the resistance imposed on the wheels and for controlling the rotation of each wheel independently of the velocity of the rotation of the other wheel.

7. In a continuously variable automatic speed and differential gear, a driving shaft, a plurality of disks fixed to said shaft, one of said disks being adjustable longitudinally of said shaft, an intermediate and freely rotatable disk mounted on said shaft, a driven disk and a loosely mounted disk interposed between said intermediate disk and each of the driving disks, a wheel connected to each of said driven disks, means for modifying the speed of rotation of said driven shafts proportionately to the resistance imposed on the wheels and for controlling the rotation of each wheel independently of the velocity of the rotation of the other wheel, and cushioning means for maintaining the necessary pressure and consequent friction between the driving and driven disks.

8. In a continuously variable automatic speed and differential gear, a driving shaft, a sleeve rotatable with and adjustable longitudinally of said shaft, a disk fixed to the lower end of said sleeve, elastic cushioning means interposed between the upper end of said sleeve and the end of the driving shaft, a disk fixed adjacent the other terminal of said shaft, an intermediate and freely rotatable disk mounted on said shaft, a driven disk and a loosely mounted disk interposed between said intermediate disk and each of the driving disks, a wheel connected to each of said driven disks, means for modifying the speed of rotation of said driven shafts proportionately to the resistance imposed on the wheels and for controlling the rotation of each wheel independently of the velocity of the rotation of the other wheel.

9. In a continuously variable automatic speed and differential gear, a driving shaft, a plurality of disks fixed to said shaft, one of said disks being adjustable longitudinally of said shaft, an intermediate and freely rotatable disk mounted on said shaft, a driven disk and a loosely mounted disk interposed between said intermediate disk and each of the driving disks, each of said driven disks having a screw sleeve with inwardly-projecting lugs and a complemental collar, a sprocket shaft secured to said collar, a slotted casing inclosing said sprocket shaft, and a spring within said casing and surrounding said shaft and adapted to abut the lugs of said sleeve and control the rotation of said driven disks.

10. In a continuously variable automatic speed and differential gear, a driving shaft, a sleeve rotatable with and adjustable longitudinally of said shaft, a disk fixed to the lower end of said sleeve, elastic cushioning means interposed between the upper end of said sleeve and the end of the driving shaft, a disk fixed adjacent the other terminal of said shaft, an intermediate and freely rotatable disk mounted on said shaft, a driven disk and a loosely mounted disk interposed between said intermediate disk and each of the driving disks each of said driven disks having a screw sleeve with inwardly projecting lugs and a complemental collar, a sprocket shaft secured to said collar, a slotted casing inclosing said sprocket shaft, and a spring within said casing and surrounding said shaft and adapted to abut the lugs of said sleeve and control the rotation of said driven disks.

In testimony whereof we have hereunto set our hands in presence of two subscribing witnesses.

HENRY PATTISON.
LUIGI SCAGLIA.

Witnesses:
T. J. McLAUGHLIN,
LEVI E. BUONOCORE.